(12) United States Patent
Kalberer et al.

(10) Patent No.: US 7,972,068 B2
(45) Date of Patent: Jul. 5, 2011

(54) HEADER ASSEMBLY FOR COMMUNICATIONS MODULE

(75) Inventors: Martin A. Kalberer, Redwood City, CA (US); Hongyu Deng, Saratoga, CA (US); Maziar Amirkiai, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/506,093

(22) Filed: Jul. 20, 2009

(65) Prior Publication Data

US 2011/0013912 A1 Jan. 20, 2011

(51) Int. Cl.
*G02B 6/36* (2006.01)
(52) U.S. Cl. ............................. 385/94; 385/92
(58) Field of Classification Search ............. 385/92–94
See application file for complete search history.

(56) References Cited

U.S. PATENT DOCUMENTS

| | | | |
|---|---|---|---|
| 5,052,808 A | 10/1991 | Hilby | |
| 5,386,141 A | 1/1995 | Liang et al. | |
| 6,590,706 B1 | 7/2003 | Xie | |
| 6,841,815 B2 | 1/2005 | Nguyen | |
| 6,847,053 B2 | 1/2005 | Kuhara | |
| 6,868,104 B2 | 3/2005 | Stewart | |
| 6,873,800 B1 | 3/2005 | Wei | |
| 6,876,004 B2 | 4/2005 | Rosenberg et al. | |
| 6,920,161 B2 | 7/2005 | Riaziat et al. | |
| 6,940,885 B1 | 9/2005 | Cheng | |
| 7,061,949 B1 | 6/2006 | Zhou et al. | |
| 7,210,862 B2 * | 5/2007 | Yoshikawa et al. | 385/92 |
| 7,211,830 B2 | 5/2007 | Rosenberg et al. | |
| 7,229,295 B2 * | 6/2007 | Ice et al. | 439/79 |
| 7,267,553 B2 * | 9/2007 | Sone | 439/67 |
| 7,492,798 B2 | 2/2009 | Deng | |
| 2002/0118904 A1 | 8/2002 | Man et al. | |
| 2003/0102157 A1 | 6/2003 | Rosenberg et al. | |
| 2003/0138008 A1 | 7/2003 | Riaziat et al. | |
| 2003/0152390 A1 | 8/2003 | Stewart | |
| 2003/0178657 A1 | 9/2003 | Nguyen et al. | |
| 2005/0047731 A1 | 3/2005 | Hu et al. | |
| 2005/0105911 A1 | 5/2005 | Keh | |
| 2005/0116239 A1 | 6/2005 | Rosenberg et al. | |
| 2005/0162761 A1 * | 7/2005 | Hargis et al. | 359/820 |
| 2005/0185900 A1 | 8/2005 | Farr | |
| 2005/0201433 A1 | 9/2005 | Riaziat et al. | |
| 2005/0249450 A1 | 11/2005 | Schrodinger | |
| 2006/0022213 A1 | 2/2006 | Posamentier | |

(Continued)

FOREIGN PATENT DOCUMENTS

CN 2007800152873 12/2009

(Continued)

OTHER PUBLICATIONS

U.S. Appl. No. 11/740,781, Mailed Date Jul. 13, 2010, Office Action.

(Continued)

*Primary Examiner* — Rhonda S Peace
(74) *Attorney, Agent, or Firm* — Maschoff Gilmore & Israelsen

(57) ABSTRACT

In one example, a header assembly for use in a communication device has a base that includes a plurality of single ports through which a corresponding plurality of leads extends. The leads are retained in their respective single ports by a retainer material. Additionally, the base includes one or more plural ports through which two or more leads extend.

19 Claims, 4 Drawing Sheets

U.S. PATENT DOCUMENTS

2006/0192221 A1    8/2006    Zhou et al.

FOREIGN PATENT DOCUMENTS

KR    10-2008-7028988        10/2010

OTHER PUBLICATIONS

U.S. Appl. No. 11/740,781, Mail Date Aug. 29, 2009, Restriction Requirement.
U.S. Appl. No. 11/740,781, Mail Date Dec. 30, 2009, Office Action.
U.S. Appl. No. 11/740,781, filed Apr. 26, 2007, Douma.
Agilent Technologies, et al., Small Form-factor Pluggable (SFP) transceiver Multi Source Agreement (MSA), Cooperation Agreement for Small Form-Factor Pluggable Transceivers, Sep. 14, 2000.
Lee W. Young, Written Opinion of the International Searching Authority, Apr. 2, 2008, US.
U.S. Appl. No. 11/456,848, Mail Date Oct. 18, 2007, Office Action.
U.S. Appl. No. 11/456,848, Mail Date May 20, 2008, Notice of Allowance.
U.S. Appl. No. 11/456,848, Mail Date Oct. 9, 2008, Notice of Allowance.

\* cited by examiner

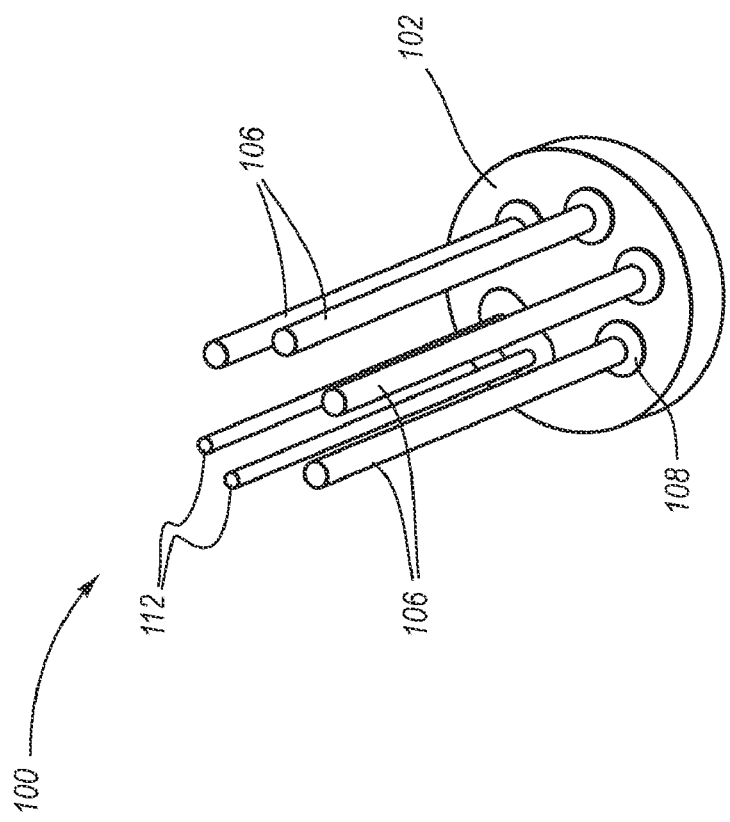
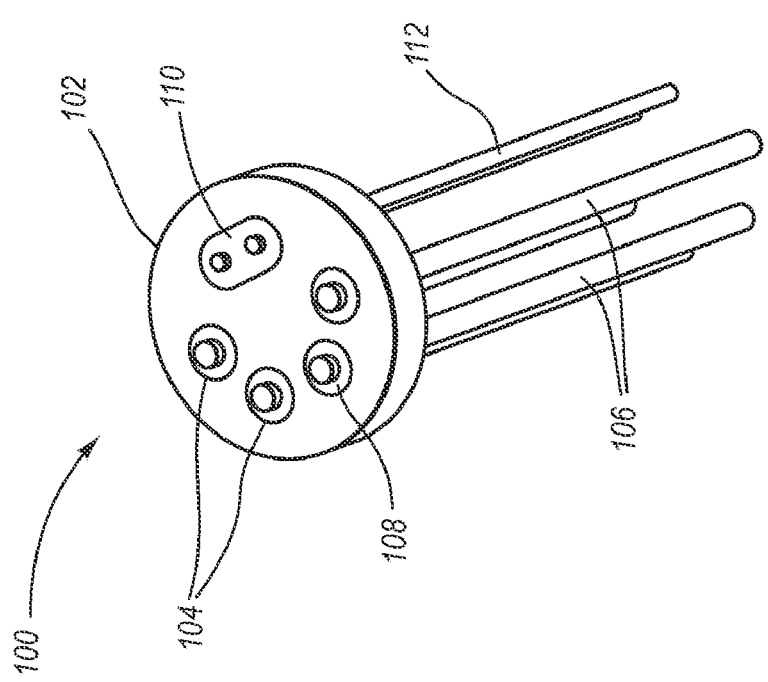

HEADER ASSEMBLY FOR COMMUNICATIONS MODULE

BACKGROUND

1. Field of the Invention

The present invention generally relates to optoelectronic devices. In particular, some example embodiments of the present invention relate to a header assembly for a communications module.

2. Related Technology

Recent trends in the advancement of optical data communications have resulted in smaller components and faster data transmission rates. This trend has created several challenges with regards to the manufacturing and operation of optoelectronic communication devices such as transmitter optical subassemblies ("TOSA"), receiver optical subassemblies ("ROSA") and optical transceiver modules.

One such challenge is that faster data transmission rates may reduce the integrity of the data signal. As data transmission rates increase within communication networks, solutions are constantly being sought to accommodate such rates while at the same time maintaining a quality data signal.

Along with problems in data signal quality, another challenge created by advancements in optical data communications is that smaller designs result in limited area to integrate optical components. The limited area available on a TOSA, for example, can make it difficult to efficiently and reliably integrate components necessary to operate optical data communication devices.

Therefore, as data rates continue to rise, and optoelectronic devices evolve to smaller designs, a need exists for optoelectronic devices that are capable of transmitting a quality data signal at prevailing data rates, while at the same time providing sufficient area to integrate necessary components.

BRIEF SUMMARY OF AN EXAMPLE EMBODIMENT OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example, a header assembly for use in a communication device has a base that includes a plurality of single ports through which a corresponding plurality of leads extends. The leads are retained in their respective single ports by a retainer material. Additionally, the base includes one or more plural ports through which two or more leads extend.

BRIEF DESCRIPTION OF THE DRAWINGS

To clarify certain aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A and 1B show perspective views disclosing aspects of an example header assembly;

DETAILED DESCRIPTION OF SOME EXAMPLE EMBODIMENTS

Figure 2A:
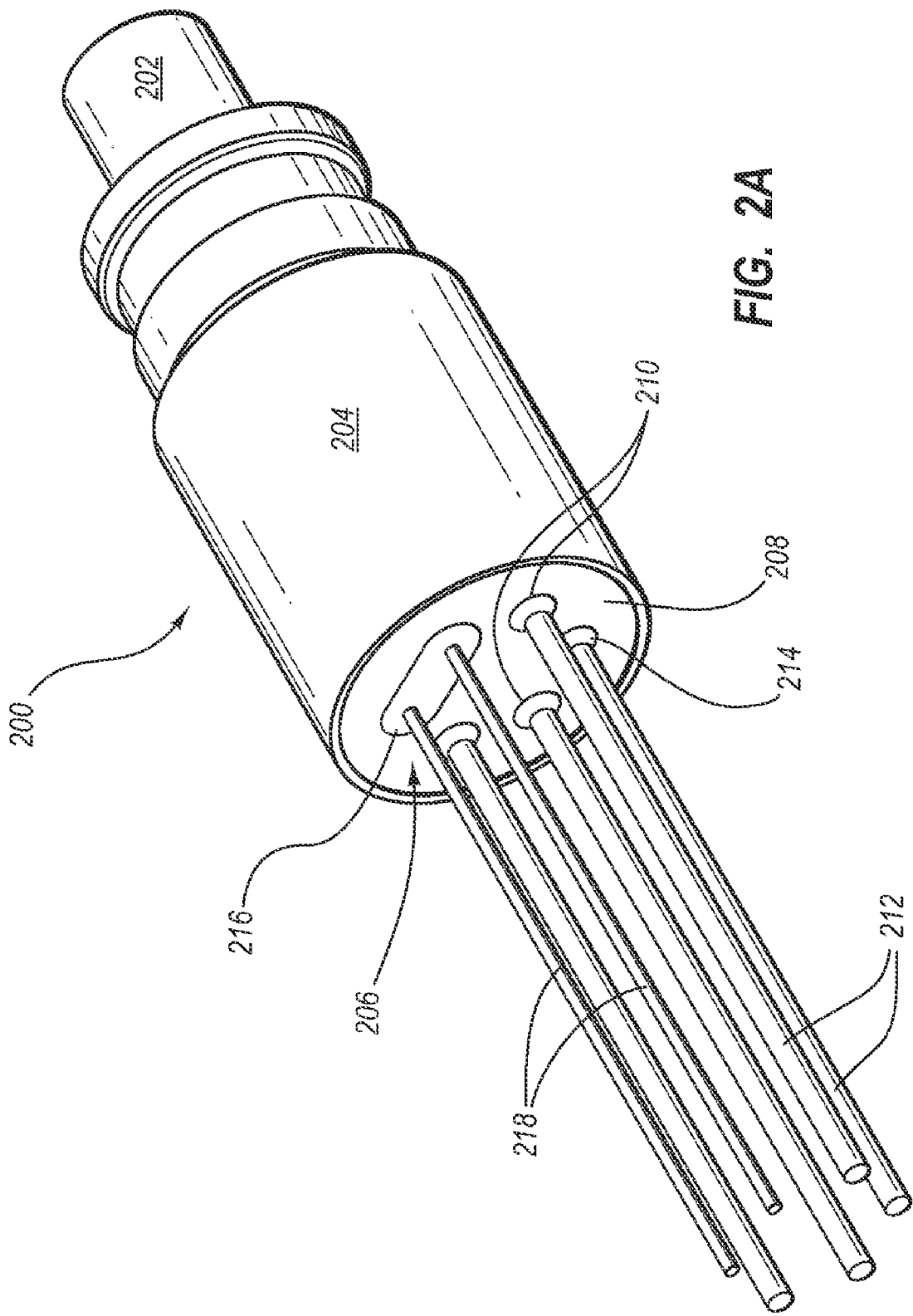
FIG. 2A is a perspective view disclosing aspects of an example optical subassembly.

Reference will now be made to the drawings to describe various aspects of some example embodiments of the invention. The drawings are only diagrammatic and schematic representations of such example embodiments and, accordingly, are not limiting of the scope of the present invention, nor are the drawings necessarily drawn to scale. Embodiments of the invention relate to header assemblies, optical subassemblies and optoelectronic modules.

I. Example Header Assembly

Directing attention to FIGS. 1A and 1B, aspects of one example embodiment of a header assembly 100 are disclosed. The header assembly 100 has a base 102 that includes a plurality of single ports 104 through which a corresponding plurality of leads 106 extend. The leads 106 are retained in their respective ports by a retainer material 108. Additionally, the base 102 includes one or more plural ports 110 through which two or more leads 112 extend.

In operation, for example, a direct current may be supplied to the leads 106. The direct current may, for example, provide power to various optoelectronic and/or electronic devices supported by the base. The two leads 112 extending through the plural port 110 may communicate an electrical data modulation signal and be electrically connected to an optical transmitter that converts the electrical data modulation signal into a modulated optical data signal.

The above mentioned example aspects may enable a header assembly to transfer a quality data signal at a higher rate than a header assembly lacking the same structural and operational design. Such a header assembly may also provide a larger area for integrating various header components relative to a header assembly lacking the same structure. These embodiments, along with additional structural and operational aspects of some embodiments of the invention will be discussed further.

A. Example Structural Aspects

Header assemblies made in accordance with various embodiments of the present invention may have various configurations. The base 102 of the header assembly 100 is an example of a component that may have various configurations. For instance, the shape of the base may vary from one embodiment to another depending on, for example, the number of leads, the number of plural ports, and/or the area required for header components. FIGS. 1A and 1B show an example of a base 102 that is substantially circular in shape. However, various other shapes can be used for the base. For example, the base may be substantially oval, polygonal, square, or any combination thereof. Moreover, any other shape may be used that will accommodate the required number of leads while maintaining the necessary area on the base to integrate required header components.

The overall size of the base is another example of how the base configuration may vary from one embodiment to another. For instance, a circular base shape, as shown in FIGS. 1A and 1B, may have varying diameters from one embodiment to another depending on, for example, the required area of the base. The geometric dimensions of a base with a non-circular shape may also be varied to affect the overall size of the base, making the base larger or smaller as desired.

As with the shape and size of the base, the thickness of the base may also vary. FIGS. 1A and 1B show an example base 102 with a substantially uniform thickness across the base 102. However, the base thickness can vary to include any non-uniform thickness. For example, a depression may be formed in the center and/or other locations of the base such that header components may be disposed in the depression. Other variations in base thickness may also be used.

Variations in the base construction are not limited to its geometry. Materials used in the construction of the base may vary as well. Such materials may include, for example, plastics, ceramics, polymers, metals or combinations thereof. In one example embodiment, the base material comprises metal so as to serve as an EMI barrier that may block electromagnetic radiation that could cause electromagnetic interference (EMI).

As noted earlier, embodiments of the base 102 may include a plurality of single ports 104 and one or more plural ports 112 that extend through the base 102. The term "single port" refers to a port though which only one lead extends. Where two or more leads extend though the same port, the term "plural port" is used. Single ports and plural ports will collectively be referred to using the generic term "port." Port configurations may vary from one embodiment to the next and from one port to another within a given embodiment.

Geometric characteristics, such as shape, are one way in which port configurations may vary. For example, FIGS. 1A and 1B show the single ports 104 having a substantially circular shape, while the plural port 110 has a substantially oblong shape. Other example port shapes include circular, square, oval, trapezoidal, triangular, polygonal, or combinations thereof. Port geometries may also include countersinks or counterbores on one or both sides of the base.

Another geometric characteristic that may vary is the overall size of the ports. Port sizes may vary depending on the size of the leads, as well as on the area available on the header assembly. FIGS. 1A and 1B show one example embodiment where the single port 104 diameters are larger than the lead 106 diameters and substantially equal with respect to one another. In a different embodiment, single port diameters may vary from one single port to the next and the single port diameters may be substantially equal to the corresponding lead diameter such that the lead may contact the single port edge. Non-circular port geometries can also be varied in size by adjustment of their respective geometric dimensions. Likewise, plural port sizes can be varied in a similar manner and may be any size that accommodates the leads while maintaining the necessary area on the header assembly for header components.

Variations in port configurations are not limited to geometric characteristics. For example, the number of single ports and plural ports may vary from one embodiment to another. FIGS. 1A and 1B, for example, show a port configuration with four single ports 104 and one plural port 110. However, the number of single port(s) 104, as well as the number of plural port(s) 110, may vary depending on, for example, the number of leads needed, size of leads, lead position, header assembly size, types of leads (e.g. data, power, monitor, etc.), and/or the area required on the header assembly for header components. For example, another embodiment may include two single ports and two plural ports. Moreover, another example embodiment may only include plural ports.

Along with variations in the number of ports, the arrangement of the ports within the base is another way in which the port configuration may vary. The port arrangement may vary depending on, for example, the number of leads, the number of single ports, the number of plural ports, size of leads, lead position, header assembly size, types of leads (e.g., data, power, monitor, etc.), and/or the area required on the header assembly for header components. FIGS. 1A and 1B show an example of an arrangement where the single ports 104 are arranged in a substantially semi-circular pattern with substantially equal spacing from one port to another around the circumference of the semi-circle. In other examples, the single ports may be arranged in rows, in a pattern where the single ports are separated by a non-uniform distance, or any other desired arrangement.

Just as with the single ports, the arrangement of the plural port(s) may also vary from one embodiment to the next. FIGS. 1A and 1B show one example where an oblong shaped plural port 110 is arranged on a substantially circular base 102 such that the plural port 110 is located off-center of the base 102 and the straight edges of the plural port 110 are substantially perpendicular to a radius of the base 102 that bisects the plural port. In another example, the plural port may be arranged such that the straight edges of the plural port are substantially parallel to a radius of the base that bisects the plural port or the plural port may be located substantially in the center of the base. Of course, as the shape of the base and shape of the plural port(s) vary, other example arrangements of the plural port(s) are possible and may take any form that provides sufficient area for, and effective electrical connection to, optoelectronic and electrical components supported by the base.

Variations in single port 104 and plural port 110 configurations often relate to the characteristics of the leads 106 and 112. Lead characteristics may vary from one embodiment to another and within an embodiment. One way in which lead characteristics may vary is in the geometric configuration of the leads. While the leads 106 and 112 depicted in FIGS. 1A and 1B have a substantially round cross-section, any cross-sectional shape may be used. Other example cross-sectional shapes include square, polygonal, oval, or rectangular. Leads used on the same header assembly may also have shapes that vary from one lead to the next.

The shape is only one example of a geometric lead characteristic that can be varied. The size of the leads may also be varied from one embodiment to the next and from one lead to another within a given embodiment. The lead size refers to the cross-sectional area of a given lead, and may be varied depending on, for example, desired electrical properties such as inductance. In one example embodiment, shown in FIGS. 1A and 1B, the leads 112 each have a relatively smaller cross-sectional area than each of the leads 106. In another embodiment, all leads may be substantially the same size. In general, electrical properties of the leads can be adjusted by varying the geometric configuration of the leads.

Variations in lead geometric configurations are often related to lead material variations since both can affect lead electrical properties. One example lead material is Kovar™, which is a composition that substantially comprises iron, nickel, and cobalt with small amounts of various other elements. Other example lead materials may include manganese, silicon, aluminum, magnesium, zirconium, titanium, carbon, or combinations thereof. Any other suitable electrically conducting materials may also be used.

Characteristics, such as lead material, may be influenced by the type of lead needed, which may vary. By way of example, referring to FIGS. 1A and 1B, one pair of leads 106 can carry an electric current, such as a DC current, to power the optical transmitter. The second pair of leads 106 may be used to power one or more other optoelectronic or electronic components. Finally, the leads 112 can be used to transmit a modulated electrical current, such as an AC current, that provides a data modulation signal to the optical transmitter and/or other optoelectronic or electronic devices. However, in other embodiments, leads may be used to communicate monitor signals, control signals, or any other electrical signal as required by the header components.

Header component requirements may also determine the number of leads employed. For example, FIGS. 1A and 1B show an example header assembly with a total of six leads 106 and 112. Other example embodiments may have more or fewer leads depending on the requirements of the header components.

Not only may the total number of leads vary, but the number of leads that extend through a plural port may also vary. Extending multiple leads through a plural port may be advantageous for a variety of reasons. For example, the usable area on the base may increase as the number of leads that share a port increase. More base area is made available by leads sharing a port because the total number of ports required may decrease and thus provide more available area. FIGS. 1A and 1B show one example with two leads 112 extending through the plural port 110. Alternatively, three, four, or more leads may extend through one plural port. The leads extending through the same plural port may, for example, be power leads, data signal leads, monitor leads, control leads or a combination thereof.

The leads 106 and 112 are maintained in place in their respective ports by a retainer material 108, characteristics of which may vary from one embodiment to the next and from one port to another. In one embodiment of the invention, the retainer material 108 may substantially comprise a dielectric material, such as a glass or ceramic. Other possible retainer materials include various epoxies or resins. Additionally, where temperature control would be beneficial, the retainer material may be a thermally insulating material, or thermally conducting material. Furthermore, the retainer material, in some embodiments of the invention, may serve as a hermetic seal for each port.

Independent of the type of retainer material, the arrangement of the retainer material 108 within the ports may vary. FIG. 1A, for example, shows the retainer material 108 as being substantially flush with the base 102 on the side of the base 102 where the leads 106 and 112 may connect to various header components. In FIG. 1B, the retainer material 108 is slightly raised above the base 102 surface where the leads 106 and 112 enter the base 102. In another example, the retainer material may be disposed below the base surface on one or both sides of the base such that the retainer material does not completely extend through the port.

B. Example Operational Aspects

As noted earlier, the header assembly 100 with the plural port 110 may allow for a quality data modulation signal to be transmitted at a faster rate due to the impedance properties that characterize the plural port 110. In a header assembly that does not include a plural port, variations in retainer material properties, the distance between single ports, and lead placement within their respective single ports can make it difficult to achieve a useful through-port impedance design range.

The inconsistent nature of through-port impedance in such a header assembly can cause a decrease in signal quality due to the difficulty in matching the through-port impedance with the impedance of various electrical or optoelectronic components connected to a particular lead such as an optical transmitter or a receiver. If the through-port impedance differs excessively from that of the connected components, then reflections in the electrical signal increase. These reflections can compromise the quality of the signal and limit the rate at which a useful electrical data signal may be transmitted. Impedance matching is particularly important for electrical data modulation signals because electrical data modulation signals are more susceptible to signal reflections due to its relative high frequency.

In contrast to a header assembly that lacks any plural ports, a plural port header assembly allows the impedance through the plural port to be controlled more precisely. More precise through-port impedance control is possible for a plural port because two or more leads extend through a common plural port and are retained by the same retainer arrangement within that plural port, thus reducing the number of variables that affect the through-port impedance. Moreover, the plural port design not only produces a more precise control of the impedance, but also allows for a larger impedance design range.

With more precise impedance control, and a larger impedance design range, the plural port header design allows for more effective impedance matching, reduces electrical signal reflections, and permits a higher quality data modulation signal to be transmitted at a faster rate relative to a header lacking a plural port for accommodating multiple data signal leads. For example, a header assembly that does not include a plural port may transmit a data modulation signal with a certain quality at a rate of about 10 Gb/s. In comparison, a substantially equivalent header assembly that instead includes a plural port accommodating the data signal leads may transmit substantially the same quality of data modulation signal at a rate of about 17 Gb/s.

The plural port design not only improves the transmission rates of data modulation signals, but also enables an increase in the amount of area on the header assembly to integrate header components. Given the same number of leads, a single lead port design has less useful area on the base to integrate additional header components than does a plural port header assembly. The increase in useful area may, for example, provide the area necessary for integration of additional header components, or reduce the manufacturing costs to integrate optical components due to less stringent tolerances.

II. Example Optical Subassemblies

Figure 2B:
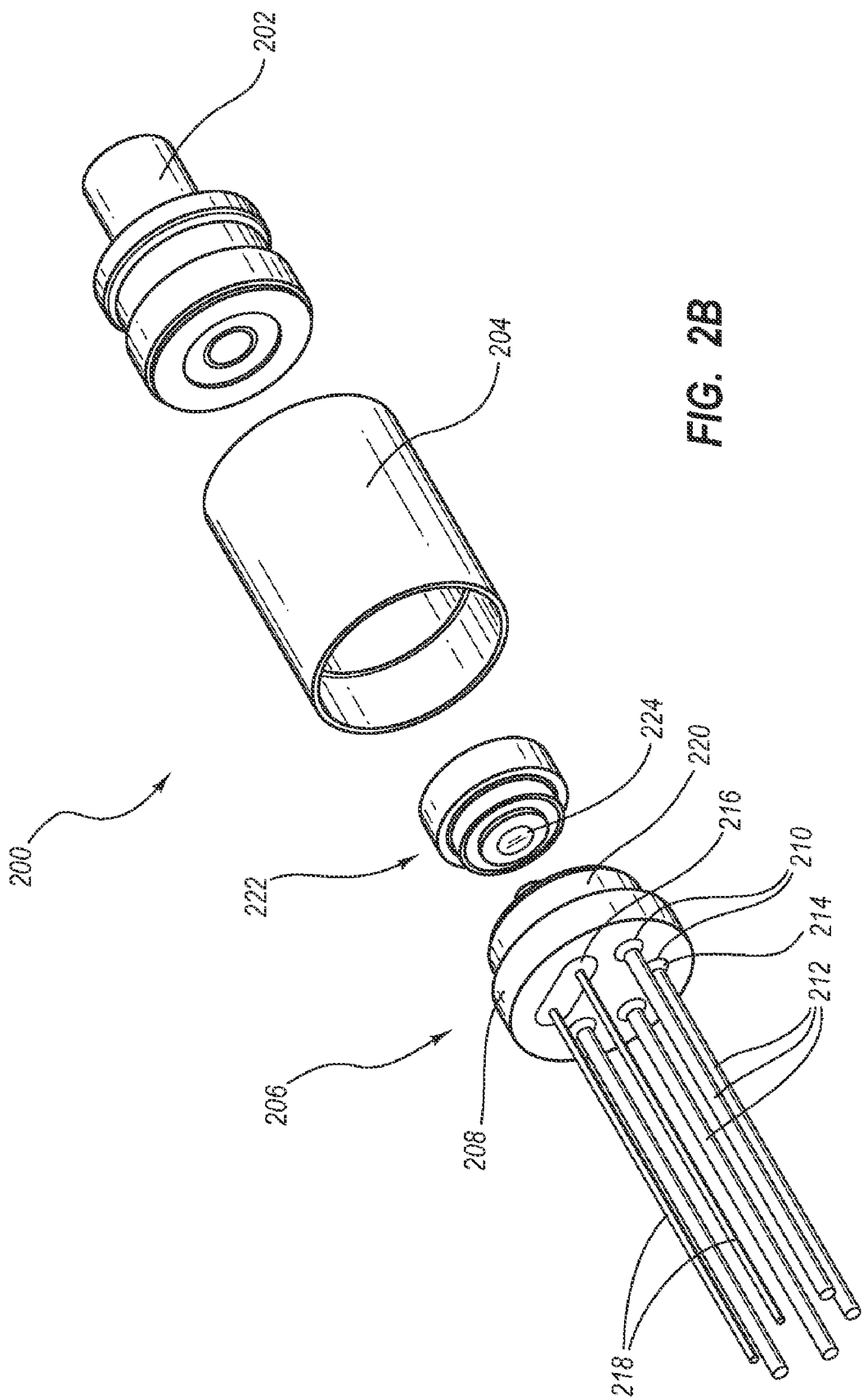
FIG. 2B is an exploded view disclosing aspects of the example optical subassembly of FIG. 2A.

Example embodiments of the header assembly may be incorporated into various components and devices, including optical subassemblies ("OSA"). Some examples of OSAs are TOSAs, ROSAs, or transponders. FIGS. 2A and 2B show example aspects of one example embodiment of a TOSA 200. Directing attention to FIG. 2A, the TOSA 200 has a nose piece 202 that is coupled to one end of a can 204. The other end of the can 204 is coupled to a header assembly 206 that includes a base 208. The base 208 includes a plurality of single ports 210 and a corresponding plurality of leads 212 extending through their respective single ports 210. The leads 212 are retained within their respective single ports 210 by a retainer material 214. The base 208 also includes a plural port 216, and in the illustrated example two leads 218 extend through the plural port 216. As indicated in FIG. 2B, the TOSA 200 further includes an optical transmitter 220 supported by the header assembly 206 and electrically connected to the two leads 218. Also, contained within the can 204 is a lens assembly 222 that includes a lens 224. The lens is optically coupled with the optical transmitter 220.

Generally, in operation, the above described TOSA 200 converts an electrical data modulation signal into an optical data signal and transmits the optical data signal into a wave guide (not shown), such as an optical fiber. In one example embodiment, an electrical data modulation signal is transmitted by the two leads 218 that extend through the plural port 216. The optical transmitter 220 converts the electrical data modulation signal into an optical data signal. The optical data signal is emitted from the optical transmitter 220 and passes through the lens 224 that is part of the lens assembly 222. The lens 224 is adapted to focus light from the optical transmitter 220 such that the light can be further propagated in a wave guide (not shown).

The TOSA 200 may incorporate various types of components. For example, the optical transmitter 220 may be one of several types of optical transmitters capable of generating a modulated optical data signal. One example optical transmitter is a laser that is configured to be supported by the header assembly 208 and generate a modulated optical data signal. The laser may be an edge-emitting laser such as a Fabry Perot ("FP") or distributed feedback ("DFB") laser. Alternatively, the laser may be a vertical-cavity surface-emitting laser ("VCSEL"). Other optical transmitters may also be used, such as a light-emitting diode ("LED").

The optical transmitters may be configured to transmit the optical data signal at a variety of wavelengths. In one example embodiment, the optical transmitter operates with a wavelength in the range of about 1310 nm to about 1550 nm. However, in other embodiments, the optical transmitter may operate at shorter wave lengths. For example, a VSCEL may be configured to transmit an optical data signal at a wavelength of about 750 nm to about 850 nm. The transmission wavelength of other embodiments of a TOSA may be longer or shorter than in the aforementioned examples. Moreover, a single TOSA may be configured to transmit an optical data signal in both a single mode and/or multi-mode fiber.

As with the transmission wavelength, the speed at which the TOSA transmits data may vary from one embodiment to the next and within a given embodiment. In one example embodiment, the TOSA 200 transmits data at a rate of about 17 Gb/s. Other example embodiments may transmit at a rate of about 10 Gb/s, about 14 Gb/s, about 15 Gb/s, or higher data rates. Lower data rates may also be used.

The various data transmission rates may be used within several network protocols, each of which may be compatible with the TOSA. Example protocols include, but are not limited to, SONET, Ethernet, and 10G Ethernet. Embodiments of the invention are not limited to any particular data rate, protocol, transmission wavelength, or combination thereof.

Besides the optical transmitter, TOSAs may also include various other components supported by the header assembly 208. The plural port header assembly configuration enables a larger base area to integrate various components relative to a header assembly lacking a plural port. Some example components include optical turners, capacitors, resistors, back-reflection inhibitors, monitors, amplifiers, attenuators, thermistors, and others. Moreover, the optical subassembly may be designed as a ROSA. In place of the optical transmitter found in the TOSA, the ROSA is configured with a receiver, such as a photodetector. The ROSA may also include various components that allow the ROSA to receive an optical data signal and convert it to an electrical data signal.

Another example of a TOSA component that is used to assist in the communication of the optical data signal is the lens assembly 222. For example, FIG. 2B shows a lens assembly with a single lens 224, such as a ball lens. However, the lens assembly 222 may also be any suitable combination of lenses adapted to focus light from the optical transmitter 220 such that the light can be further propagated in a wave guide (not shown). In a receiver application using a photodiode, the lens assembly 222 is adapted to focus light from the wave guide onto the photodiode.

III. Example Optoelectronic Module

Optical subassemblies are often incorporated into an optoelectronic module for use in standardized equipment with predefined requirements. An optoelectronic module may combine a TOSA with a ROSA so as to form a transceiver. However, there is no requirement for a TOSA to be combined with a ROSA. Moreover, some optoelectronic modules are designed to be transponders.

Figure 3:
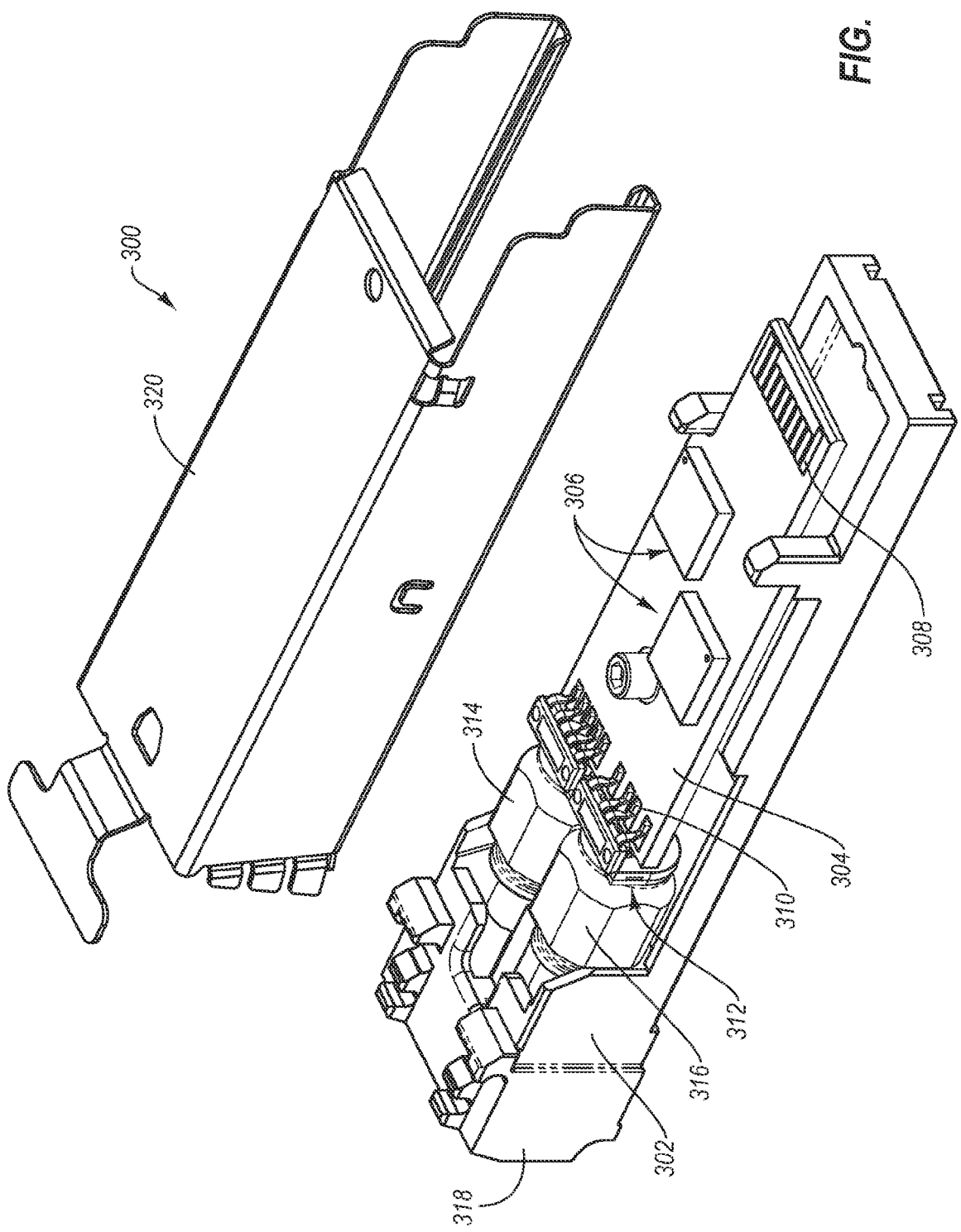
FIG. 3 is a perspective view disclosing aspects of an example optoelectronic module.

FIG. 3 shows example aspects of an optical transceiver module 300 for use in transmitting and receiving optical and electrical signals to and from an external host (not shown) that may be operatively connected to a communications network. The transceiver 300 includes a housing 302 where various transceiver components are disposed. The housing 302 may completely enclose the various components, or alternatively, the housing 302 may only partially enclose some or all of the various components. Disposed at least partly within the housing 302 is a printed circuit board 304 that includes various electronic components 306 such as a post-amplifier and laser driver for example. One end of the printed circuit board 304 includes an edge connector 308 that is designed to physically and electrically interface with a host (not shown). The other end of the printed circuit board 304 has connection pads 310 that are electrically connected to an electrical interface 312, such as a lead frame (shown) or flex connectors (not shown). A TOSA 314 and a ROSA 316 are electrically connected to the electrical interface 312. A connector block 318 enables the connection of optical connectors (not shown) to the transceiver module. A shell 320 may be combined with the housing 302 to form at least a partial enclosure for the various components of the transceiver 300.

The transceiver 300 illustrated in FIG. 3 conforms to the XFP size and operating standards as dictated by the corresponding multi-source agreement ("MSA") known in the industry. Other MSAs specify alternative size and operating standards such as SFP, and SFP+. The above MSAs are incorporated herein by reference in their entirety. Other example embodiments of the transceiver may be designed to conform to SFP, SFP+ or other MSAs not yet established.

By way of operational overview, the transceiver 300 receives an electrical data signal from an external host device (not shown), such as any computing or communication system or device capable of communicating with the optical transceiver. The electrical data signal supplied to the transceiver 300 is communicated by the printed circuit board 304 to the TOSA 314. The TOSA 314 converts the electrical data signal to an optical data signal. The optical data signal is then transmitted by the TOSA 314 to a wave guide (not shown) that is optically coupled to the TOSA 314.

In addition, the transceiver 300 is configured to receive optical data signals from a wave guide (not shown) that is optically coupled to the ROSA 316. The ROSA 316 employs a receiver, such as a photodetector or other suitable device, to convert the received optical data signal into an electrical data signal. The resulting electrical data signal is communicated to the printed circuit board 304 and transmitted to a host device (not shown). The TOSA 314 and/or the ROSA 316 includes the header assembly 100, shown in FIGS. 1A and 1B, allowing for the transmission of quality data signals through the transceiver 300 at a higher rate relative to transceivers that lack such a header assembly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A header assembly, comprising:
    a base;
    a plurality of single ports extending through the base;
    a plurality of electric leads, each of which extends through a corresponding single port and each lead being retained in position in its respective single port by a retainer material, each of the plurality of electric leads for carrying low-speed electrical signals used to provide an electrical signal to one or more electric components; and
    a plural port through which two leads extend, the two leads being retained in the plural port by a retainer material, wherein the two leads extending through the plural port are high speed data signal leads used to provide a modulation signal to an optical transmitter, wherein providing the modulation signal only on the two leads extending through the plural port allows for the modulation signal to be provided at a faster speed and with higher quality than if the modulation signal were provided by one or more of the plurality of electric leads extending through the corresponding single port due at least in part to improved impedance matching of the two leads extending through the plural port.

2. The header assembly as recited in claim 1, further comprising an optoelectronic component supported by the base, wherein the optoelectronic component is the optical transmitter or an optical receiver.

3. A header assembly as recited in claim 1, wherein the base is made from a material that is substantially non-transmissive to electromagnetic radiation.

4. A header assembly as recited in claim 1, wherein the electric leads substantially comprise a composition of iron, nickel, and cobalt.

5. A header assembly as recited in claim 1, wherein the retainer material substantially comprises a dielectric material.

6. A header assembly as recited in claim 1, wherein impedance associated with the plural port substantially matches an impedance associated with another electronic component supported by the header assembly.

7. An optical subassembly, comprising:
    a nose piece;
    a shell coupled to the nose piece;
    a header assembly coupled to the shell, the header assembly comprising:
        a base;
        a plurality of single ports extending through the base;
        a plurality of electric leads, each of which extends through a corresponding single port and each lead being retained in position in its respective single port by a retainer material, each of the plurality of electric leads for carrying low-speed electrical signals used to provide an electrical signal to one or more electric components; and
        a plural port through which two leads extend, the two leads being retained in the plural port by a retainer material, wherein the two leads extending through the plural port are high speed data signal leads used to provide a modulation signal to an optoelectronic component, wherein providing the modulation signal only on the two leads extending through the plural port allows for the modulation signal to be provided at a faster speed and with higher quality than if the modulation signal were provided by one or more of the plurality of electric leads extending through the corresponding single port due at least in part to improved impedance matching of the two leads extending through the plural port; and
    an optoelectronic component supported by the base and electrically connected to the two leads extending through the plural port.

8. An optical subassembly as recited in claim 7, wherein the optoelectronic component is one of the following optical transmitters: Fabry Perot laser (FP), distributed feedback laser (DFB), vertical-cavity surface-emitting laser (VCSEL) or light-emitting diode (LED).

9. An optical subassembly as recited in claim 7, wherein the optoelectronic component is an optical receiver.

10. An optical subassembly as recited in claim 7, wherein the nose piece is configured to optically connect a wave guide to the optical subassembly.

11. An optical subassembly as recited in claim 10, further comprising a lens arranged to pass an optical signal between the optoelectronic component and the wave guide.

12. An optical subassembly as recited in claim 7, wherein the optoelectronic component is configured to transmit optical signals with wavelengths in a range of about 1310 nm to about 1550 nm.

13. An optical subassembly as recited in claim 7, wherein the optoelectronic component is a vertical-cavity surface-emitting laser (VCSEL) configured to transmit an optical signal with a transmission wavelength of about 750 nm to about 850 nm.

14. An optical subassembly as recited in claim 7 that is configured to transmit at one of the following data rates: 10 Gb/s, 14 Gb/s, 15 Gb/s or 17 Gb/s.

15. An optical subassembly as recited in claim 7 that is compatible with one of the following protocols: Ethernet, 10G Ethernet, or SONET.

16. An optical subassembly as recited in claim 7, further comprising one of the following additional components supported by the base: optical turners, capacitors, resistors, back-reflection inhibitors, monitors, amplifiers, attenuators or thermistors.

17. An optoelectronic module, comprising:
    a housing;
    a printed circuit board partially disposed within the housing;
    an optical subassembly at least partially disposed within the housing and being electrically connected to the printed circuit board, the optical subassembly comprising:
        a nose piece;
        a shell coupled to the nose piece;
        a header assembly coupled to the shell, the header assembly comprising:
            a base;
            a plurality of single ports extending through the base;
            a plurality of electric leads, each of which extends through a corresponding single port and each lead being retained in position in its respective single port by a retainer material, each of the plurality of electric leads for carrying low-speed electrical signals used to provide an electrical signal to one or more electric components; and a plural port through which two leads extend, the two leads being retained in the plural port by a retainer material, wherein the two leads extending through the plural port are high speed data signal leads used to provide a modulation signal to an optoelectronic component, wherein providing the modulation signal only on the two leads extending through the plural port allows for the modulation signal to be provided at a faster speed and with higher quality than if the modulation signal were provided by one or more of the plurality of electric leads extending through the corresponding single port due at least in part to improved impedance matching of the two leads extending through the plural port; and the optoelectronic component supported by the base and electrically connected to the two leads extending through the plural port wherein the optoelectronic component is either an optical transmitter or a receiver.

18. An optoelectronic module as recited in claim 17, wherein the optoelectronic module substantially conforms to one of the XFP, SPF+ or the SPF multi-source agreements.

19. An optoelectronic module as recited in claim 17, wherein the optoelectronic component is an optical transmitter, the optoelectronic module further comprising a receiver so as to form a transceiver module.

* * * * *